(12) United States Patent
Diks-Warmerdam et al.

(10) Patent No.: US 12,466,559 B2
(45) Date of Patent: Nov. 11, 2025

(54) CONTAINER FOR STORING AND SERVING FROZEN CONFECTIONERY ITEMS

(71) Applicant: Conopco, Inc., Englewood Cliffs, NJ (US)

(72) Inventors: Leonie Martine Diks-Warmerdam, Maassluis (NL); Johannes Krieg, Rotterdam (NL)

(73) Assignee: Conopco, Inc., Englewood Cliffs, NJ (US)

( * ) Notice: Subject to any disclaimer, the term of this patent is extended or adjusted under 35 U.S.C. 154(b) by 639 days.

(21) Appl. No.: 17/781,361

(22) PCT Filed: Nov. 7, 2020

(86) PCT No.: PCT/EP2020/081400
§ 371 (c)(1),
(2) Date: May 31, 2022

(87) PCT Pub. No.: WO2021/110357
PCT Pub. Date: Jun. 10, 2021

(65) Prior Publication Data
US 2022/0411064 A1    Dec. 29, 2022

(30) Foreign Application Priority Data
Dec. 4, 2019   (EP) ..................................... 19213454

(51) Int. Cl.
*B64D 11/00* (2006.01)
(52) U.S. Cl.
CPC ................. *B64D 11/0007* (2013.01)
(58) Field of Classification Search
CPC .......... F25D 11/006; F25D 3/125; F25D 3/06; B64D 11/0007; B62B 3/02; B62B 3/005; B62B 2204/04; F28D 20/021; A23G 9/225
See application file for complete search history.

(56) References Cited

U.S. PATENT DOCUMENTS

| | | | |
|---|---|---|---|
| 2,165,327 | A | 7/1939 | Philip |
| 4,296,426 | A | 10/1981 | Gilles |

(Continued)

FOREIGN PATENT DOCUMENTS

| | | |
|---|---|---|
| AU | 2014382728 | 8/2016 |
| CN | 102213529 | 10/2011 |

(Continued)

OTHER PUBLICATIONS

NPL-17781361_2024-12-05_WO_03083386_A1_I.pdf (Year: 2003).*

(Continued)

*Primary Examiner* — Frantz F Jules
*Assistant Examiner* — Martha Tadesse
(74) *Attorney, Agent, or Firm* — Bond, Schoeneck & King, PLLC (57) ABSTRACT

A thermally insulated container for storing and sewing frozen confectionery items, and suitable for mounting within a service cart, the container comprising: a thermally insulated housing having an inner surface, defining an enclosed insulated chamber, and an outer surface for mounting engagement with a service cart, the thermally insulated housing having at least one openable portion to allow access to the enclosed insulated chamber through both the inner and outer surfaces; a product storage assembly, mounted within the enclosed insulated chamber, having an outer surface and an inner surface, the inner surface defining an internal product storage chamber, the internal product storage chamber being accessible via the openable portion of the thermally insulated housing, and the outer surface being substantially parallel to but spaced away from substantially all of the inner surface of the thermally insulated housing, the average spacing being from 1 to 10 mm; at least one frozen confectionery item support positioned in the internal product storage chamber, the frozen confectionery item support (Continued)

having an outer surface facing away from a supported item in use and an inner surface facing towards a supported item in use, and wherein a reservoir of phase change material is provided between the inner and outer surfaces of the product storage assembly and/or between the inner and outer surfaces of the at least one frozen confectionery item support.

16 Claims, 4 Drawing Sheets

(56) References Cited

U.S. PATENT DOCUMENTS

| | | | |
|---|---|---|---|
| 4,528,439 | A | 7/1985 | Marney |
| 4,898,294 | A | 2/1990 | Jennings |
| 8,763,811 | B2 | 7/2014 | Lantz |
| 9,303,912 | B1 | 4/2016 | Schalla et al. |
| 9,731,895 | B2 | 8/2017 | Manning |
| 10,046,901 | B1 | 8/2018 | Jobe |
| 10,168,090 | B1 | 1/2019 | Chapman, Jr. |
| 10,266,332 | B2 | 4/2019 | Aksan |
| 11,046,500 | B2 | 6/2021 | Collison |
| 11,078,008 | B2 | 8/2021 | Dankbaar |
| 11,199,354 | B2 | 12/2021 | Geitz |
| 11,828,516 | B2 | 11/2023 | Sun |
| 2003/0111472 | A1 | 6/2003 | Lerner |
| 2003/0131623 | A1* | 7/2003 | Suppes .......... C09K 5/063 62/434 |
| 2006/0006621 | A1 | 1/2006 | Santa Cruz et al. |
| 2009/0078708 | A1 | 3/2009 | Williams |
| 2010/0170287 | A1 | 7/2010 | Boss |
| 2011/0277489 | A1 | 11/2011 | Schalla et al. |
| 2014/0021208 | A1 | 1/2014 | Anti |
| 2014/0054297 | A1 | 2/2014 | Patstone |
| 2014/0263835 | A1 | 9/2014 | Godecker et al. |
| 2014/0331946 | A1 | 11/2014 | Eilemann et al. |
| 2015/0143818 | A1 | 5/2015 | Eckhoff |
| 2015/0191192 | A1 | 7/2015 | Savage et al. |
| 2016/0320080 | A1 | 11/2016 | Hieke |
| 2017/0023290 | A1 | 1/2017 | Demuth |
| 2017/0297717 | A1 | 10/2017 | Moran et al. |
| 2018/0282049 | A1 | 10/2018 | Tumber |
| 2018/0339838 | A1 | 11/2018 | Hall |
| 2018/0346122 | A1* | 12/2018 | Kzrak .......... B64D 11/0007 |
| 2019/0162639 | A1 | 5/2019 | Gutelius |
| 2020/0161616 | A1 | 5/2020 | Chen |
| 2020/0290790 | A1 | 9/2020 | Mowery |
| 2021/0300665 | A1 | 9/2021 | Mechor |
| 2022/0087254 | A1 | 3/2022 | Bixon |

FOREIGN PATENT DOCUMENTS

| | | | | |
|---|---|---|---|---|
| CN | 102379532 | | 11/2011 | |
| CN | 102607235 | | 7/2012 | |
| CN | 103988045 | | 8/2014 | |
| CN | 203958959 | | 11/2014 | |
| CN | 204937738 | | 1/2016 | |
| CN | 205947109 | | 2/2017 | |
| CN | 206761922 | | 12/2017 | |
| CN | 108602562 | | 9/2018 | |
| CN | 209209482 | | 8/2019 | |
| CN | 209312826 | | 8/2019 | |
| DE | 29611084 | | 11/1996 | |
| EP | 2700891 | | 2/2014 | |
| GB | 2543837 | | 5/2017 | |
| JP | 2012102744 | | 5/2012 | |
| JP | 2012131539 | | 7/2012 | |
| JP | 2013085550 | | 5/2013 | |
| JP | 2016084149 | | 5/2016 | |
| KR | 100836844 | | 6/2008 | |
| KR | 101457029 | | 10/2014 | |
| WO | WO03083386 | | 10/2003 | |
| WO | WO-03083386 | A1 * | 10/2003 | ............ A23G 9/225 |
| WO | WO08104639 | | 9/2008 | |
| WO | WO2008107657 | | 9/2008 | |
| WO | WO12056086 | | 5/2012 | |
| WO | WO2015120911 | | 8/2015 | |
| WO | WO2017072508 | | 5/2017 | |
| WO | WO2019161426 | | 8/2019 | |
| WO | 2020229236 | | 11/2020 | |
| WO | 2020229421 | | 11/2020 | |
| WO | 2020110358 | | 6/2021 | |

OTHER PUBLICATIONS

Search Report and Written Opinion in EP19174511; Oct. 25, 2019.
Search Report and Written Opinoin in EP19174506; Oct. 25, 2019.
Search Report and Written Opinion in EP19213453; May 25, 2020.
Search Report and Written Opinion in EP19213454; Jun. 4, 2020.
Search Report and Written Opinion in PCTEP2020062473; Jul. 23, 2020.
Search Report and Written Opinion in PCTEP2020063082; Jul. 23, 2020.
Search Report and Written Opinion in PCTEP2020081401; Feb. 3, 2021.
Search Report and Written Opinion in PCTEP2020081400; Feb. 3, 2021.
Co-pending U.S. Appl. No. 17/610,784; filed Nov. 12, 2021, entitled Container for Storing and Serving Frozen Confectionery Items.
Co-pending U.S. Appl. No. 17/610,790; filed Nov. 12, 2021, entitled Container for Storing and Serving Frozen Confectionery Items.
Co-pending U.S. Appl. No. 17/781,362; filed May 31, 2022, entitled Container for Storing and Serving Scoopable Frozen Confectionery.

* cited by examiner

CONTAINER FOR STORING AND SERVING FROZEN CONFECTIONERY ITEMS

FIELD OF THE INVENTION

The present invention relates to a thermally insulated container for storing and serving frozen confectionery items, and particularly to such containers which are designed to be removably mountable within a service cart.

BACKGROUND OF THE INVENTION

Inflight service carts (i.e. wheeled trolleys) are commonly used for storing and dispensing food and beverages on modern commercial aircraft. Such carts facilitate at-seat service of these products during the flight. Similar service carts are used on other modes of transport (e.g. on trains). Keeping the foodstuffs at an appropriate temperature within such carts is a recognised problem.

There is prior art relating to refrigerated storage of foodstuffs within inflight service carts, which largely focuses on maintaining the temperature of the foodstuffs within the chilled range (e.g. +2° C. to +8° C.). Dry ice is typically used as the refrigerant. For example, WO 2012/056086 A1 relates to a refrigerator unit for an inflight service cart which utilises dry ice in such a way that it releases chilled air evenly, and without freezing the products.

The storage of frozen products, such as ice cream and similar frozen confections, has also been addressed by the prior art. U.S. Pat. No. 4,898,294 describes a frozen food container for aircraft usage. The container comprises bottom, end, side and top walls formed of a thermally insulating material contained between an inner and outer shell, the top wall having an insulated lid formed in the forward portion thereof. Preferably the container is provided with one or more receptacles adapted to receive dry ice, with the top wall of the container comprising these dry ice storage chambers.

Using dry ice in containers for storing and serving frozen confectionery items is not ideal. Firstly, such frozen confectionery items are too hard to be consumed directly if kept at −78° C. Secondly, since the dry ice sublimes, it will inevitably need replacing after a single use.

Therefore, there remains a need to provide insulated containers which improve the length of time that the frozen confectionery items can be kept at a suitable temperature in order to ensure that they can be consumed directly on serving. It is preferred that such insulated containers are reusable.

Furthermore, there is a need to achieve this when the frozen confectionery items are stored and served in an environment remote from a storage freezer and/or wherein the container needs to be transportable thus enabling an at-seat service of the frozen confectionery items to passengers (e.g. during a flight or a train journey).

SUMMARY OF THE INVENTION

In a first aspect, the invention relates to a thermally insulated container for storing and serving frozen confectionery items, and suitable for mounting within a service cart, the thermally insulated container being unpowered and comprising: a thermally insulated housing having an inner surface, defining an enclosed insulated chamber, and an outer surface for mounting engagement with a service cart, the thermally insulated housing having at least one openable portion to allow access to the enclosed insulated chamber through both the inner and outer surfaces; a product storage assembly, mounted within the enclosed insulated chamber, having an outer surface and an inner surface, the inner surface defining an internal product storage chamber, the internal product storage chamber being accessible via the openable portion of the thermally insulated housing, and the outer surface being substantially parallel to but spaced away from at least 90% of the surface area of the inner surface of the thermally insulated housing, the average spacing being from 1 to 10 mm; at least one frozen confectionery item support positioned in the internal product storage chamber, the frozen confectionery item support having an outer surface facing away from a supported item in use and an inner surface facing towards a supported item in use, and wherein a reservoir of phase change material is provided between the inner and outer surfaces of the product storage assembly and/or between the inner and outer surfaces of the at least one frozen confectionery item support.

In a second aspect, the present invention relates to a service cart comprising a thermally insulated unpowered container as described herein.

DETAILED DESCRIPTION OF THE INVENTION

The present invention relates to a thermally insulated container for storing and serving frozen confectionery items. There is no particular limitation with regard to the type of frozen confectionery items which can be stored and served using the insulated container. Non-limiting examples of frozen confectionery items include ice cream, gelato, frozen yoghurt, sorbet, granita, water ice, and the like.

The thermally insulated container of the present invention comprises a thermally insulated housing. The interior walls prescribing an inner surface, define an enclosed insulated chamber. The exterior walls, prescribing an outer surface, are preferably cuboid, with 6 thermally insulated sidewalls. The outer surface is designed to engage with a service cart and will contain the necessary mechanical interlocking arrangement, such as ridges, latches and interconnections to enable such engagement according to the particular design of the service cart.

The thermally insulated housing has at least one openable portion to allow access to the enclosed insulated chamber. The enclosed thermally insulated chamber is sealed when the openable portion is in a closed position and accessible when the openable portion is in an open position.

In a preferred embodiment the openable portion is a portion or the whole of one side of the thermally insulated housing. It will be apparent that it is not necessary for the entire side to open—merely that a portion of the side is openable so as to allow access to the enclosed insulated chamber. Advantageously the openable side is a door component which is hingedly attached to one of the other sides. Additionally or alternatively, the openable portion can be a removably engageable lid component.

The thermally insulated housing can be made from any suitable material having thermal insulation properties. Preferably, but not exclusively, the thermally insulated outer housing comprises a material selected from: expanded polypropylene (EPP), polyurethane (PU), Aerogel, and vacuum panels. Suitable thermally insulated outer housings are described in WO 2008/104639 A1, which is hereby incorporated in its entirety.

The thermal insulated container also comprises a product storage assembly mounted within the enclosed insulated chamber. Preferably, the product storage assembly is removably mounted within the enclosed insulated chamber, since this allows it to be cleaned separately from the thermally insulated housing. However, it is also possible for the product storage assembly to be permanently mounted within the outer housing.

The product storage assembly has an inner surface defining an internal product storage chamber. The product storage assembly also has an outer surface, defining its outer perimeter within the enclosed insulated chamber.

The product storage assembly is positioned within the enclosed insulated chamber such that there is a gap between the outer surface of the product storage assembly and the inner surface of the thermally insulated housing. The gap or spacing has a magnitude of 1 to 10 mm. This has been found to provide a good balance between providing additional thermal insulation (provided by the spacing) without compromising the size of the internal product storage chamber.

In order to ensure that the gap is maintained even when the thermally insulated container is subjected to significant vibrations (e.g. such as may be the case if turbulence in an aircraft is encountered), it is preferred that the gap has a width of at least 2 mm, more preferably at least 2.5 mm, and most preferably at least 3 mm. In order to maximise the space available for storing frozen confections within the insulated container, it is preferred that the gap has a width of no more than 8 mm, preferably no more than 6 mm, and most preferably no more than 5 mm.

Although maintenance of the spacing or gap is an essential element of the present invention, there will need to be some support structures positioning the product storage assembly within the thermally insulated housing. Therefore the outer surface of the product storage assembly is spaced away from at least 90% of the surface area of the inner surface of the thermally insulated housing, preferably at least 95%.

There are several ways to ensure that the product storage assembly is appropriately spaced away from the inner surface of the thermally insulated housing. The inner surface of the thermally insulated housing can have moulded protrusions (e.g. one at each corner) which hold the product storage assembly in place so as to maintain the necessary spacing. Since such protrusions are only in contact with the outer surface of the product storage assembly over a very limited surface area, and since they are made of the same insulating material as the thermally insulated outer housing, there is little thermal energy transfer between the product storage assembly and the outer housing. Alternatively, the product storage assembly can have pins which interact with moulded grooves in the outer housing, thus enabling the product storage assembly to "hang" within the insulated chamber. A further option is for the product storage assembly to be supported by an insulated stand having legs which are embedded in the outer housing such that these legs are the only contact points between the product storage assembly and the outer housing, with the product storage assembly and the stand being in tight contact, such that the product storage assembly is held firmly by the stand, ensuring that the product storage assembly does not move about and thus that the outer surface of the product storage assembly remains spaced from the inner surface of the thermally insulated housing.

The internal product storage chamber is accessible via the openable portion of the thermally insulated housing. This may be provided by an opening, i.e. an absence of any inner or outer surface, adjacent to the openable portion in the thermally insulated housing.

The product storage assembly preferably has at least an upper wall and a lower wall which are connected by two side walls, thereby delineating a four-sided thermally perimeter within the outer housing, leaving two faces open for access to the internal product storage chamber. In this embodiment, one of the open faces would align with the openable portion in the thermally insulated housing.

Although for convenience the walls are described with reference to their position in a preferred arrangement, the skilled person will appreciate that the thermally insulated container of the present invention is designed to be transportable and may be rotated during use. Therefore, the designation "upper wall", "lower wall" and "sidewall" should not be read as limiting the orientation of the frame per se.

It is possible (but not necessary) that the product storage assembly additionally comprises a back plate. Where such a back plate is present the product storage chamber delimits a five-sided boundary within the outer housing, with a single open face.

In this case the open face will be aligned with the openable portion in the thermally insulated housing.

The product storage assembly could additionally comprise a front plate. Where both a back plate and a front plate are present, the product storage assembly delimits a six-sided boundary within the outer housing. Where such an arrangement is present, at least one side of the product storage assembly is openable—preferably the front plate and/or the back plate, and most conveniently the front plate. Whichever plate is openable will be aligned with the openable portion in the thermally insulated housing, to provide access to the internal product storage chamber.

In order to maximise the volume available for accommodating the frozen confectionery items, it is preferred that the thickness (that being the distance from the inner surface to the outer surface) of the product storage assembly is not too great. Therefore, the product storage assembly preferably has a thickness of no more than 5 mm, more preferably no more than 4 mm, or even no more than 3 mm.

In order to preserve the spacing (or gap) between the product storage assembly and the thermally insulated housing discussed above, a relatively rigid product storage assembly is preferred (especially in arrangements with a small gap). Therefore, the product storage assembly preferably has a thickness of at least 0.5 mm, more preferably at least 0.8 mm, still more preferably at least 1 mm or even at least 1.5 mm.

Whilst it is envisaged that the upper wall, lower wall and side walls can be continuous sheets of material, this is not necessary. Indeed, one or more of these walls could have a partially discontinuous structure (e.g. a mesh-like or lattice-like structure). For example, one or more of the walls could comprise a perforated metal sheet or a wire mesh. The same is true of the front and/or back plate (where present). Such a partially discontinuous structure may be advantageous as it has the potential to reduce the overall weight of the product storage chamber. Where one or more wall has a partially discontinuous structure, it is preferred that there is an additional barrier layer to help maintain the gap between the product storage assembly and the thermally insulated housing. For example, such a barrier layer could be provided by a reservoir of phase change material, product drawer and/or any secondary packaging.

The product storage assembly comprises at least one frozen confectionery item support positioned in the internal product storage chamber, the frozen confectionery item support having an outer surface facing away from a supported item in use and an inner surface facing towards a supported item in use.

For example, the frozen confectionery item support may be a simple shelf, the upper surface of which being the inner surface and the lower surface of which being the outer surface. In a preferred embodiment the frozen confectionery item support is a drawer, which could be considered to be a shelf but with upstanding side walls. In both cases it is preferably that the frozen confectionery item support is removable from the product storage assembly, e.g. in a slideable manner, via the openable portion in the thermally insulated housing. A product storage assembly may comprise one, two, three or more such shelves or drawers, as desired.

In order to maintain the temperature-controlled environment in the internal product storage chamber a reservoir of phase change material is provided between the inner and outer surfaces of the product storage assembly and/or between the inner and outer surfaces of the at least one frozen confectionery item support.

Thus, the phase change material is provided within the walls of either the product storage assembly, or within the walls of the frozen confectionery item support, or in both.

The various methods of locating the phase change material within the walls will be known to the person skilled in the art.

In a preferred embodiment the inner surface of the internal product storage chamber comprises an inner thermally conductive sheet, and the outer surface of the internal product storage chamber comprises an outer thermally conductive sheet, the inner and outer thermally conductive sheets enclosing between them an enclosed space comprising a reservoir of phase change material. As an alternative the inner and outer surfaces could be made from a thermally insulating material, although this is understood to be less effective.

Additionally or alternatively, preferably the inner surface of the at least one frozen confectionery item support comprise an inner thermally conductive sheet, and the outer surface of the at least one frozen confectionery item support comprises an outer thermally conductive sheet, the inner and outer thermally conductive sheets enclosing between them an enclosed space comprising a reservoir of phase change material. As an alternative the inner and outer surfaces could be made from a thermally insulating material, although this is understood to be less effective.

In both cases preferably the inner and outer thermally conductive sheets are bonded metal sheets, produced in a roll bond method of manufacture. The sheets would not be planar but instead comprise depressions within the sheet, which align with a depression in the bonded sheet to provide a contained cavity, within which the phase change material is provided.

The skilled person will be able to select an appropriate phase change material. The melting temperature of the phase change material is preferably −30° C. to −6° C., −27° C. to −12° C., −25° C. to −15° C., or even −22° C. to −18° C. Eutectic material is a preferred example of a suitable phase change material. Melting temperatures at the lower ends of these ranges are preferred where longer storage periods are anticipated (e.g. if the frozen confectionery items are to be served on a long-haul flight), whereas for shorter storage periods a melting temperature at the upper end of these ranges may be more appropriate (i.e. to ensure that the frozen confectionery items are served at a temperature where they can be consumed straight away on removal from the thermally insulated container).

In order to provide sufficient cooling without compromising the amount of storage space, it has been found to be preferable that the ratio of the amount of phase change material (kg) to the volume of enclosed insulated chamber (litre) is in the range of from 1:25 to 1:5.

The thermally insulated storage container of the present invention permits frozen confectionery items to be stored and served without the need for using dry ice as a coolant. Nevertheless, if it is important to store the confectionery items for a prolonged period prior to serving them (e.g. if the frozen confectionery items are to be served on a long-haul flight), then it is preferred that the container comprises dry ice in addition to the reservoir(s) of phase change material.

The stored frozen confectionery items can optionally be enclosed within secondary packaging, such as a cardboard or paperboard carton. Where such secondary packaging is present, this can be in addition to a product drawer and/or shelf (i.e. the secondary packaging containing the frozen confectionery items can be placed within the product drawer or on the shelf).

The thermally insulated container of the present invention is relatively compact, and therefore has particular application where storage space is limited. For example, the container can be used with inflight service carts, which have dimensional challenges due to their need to be stowed during take/off and manoeuvred through the narrow aircraft aisles. The arrangement allows frozen confectionery items to be kept remote from a storage freezer for a significant period of time (typically up to 24 hours), and facilitates serving during this storage time. As such, the invention relates to an inflight service cart comprising at least one thermally insulated container according to the first aspect of the invention.

Due to the fact that the thermally insulated container is intended to be mobile and deployed within a service cart, the thermally insulated container is preferably unpowered. This means that the container does not comprise any refrigeration cycle apparatus components (such as a pump and compressor) and is not connectable to an exterior power supply.

The thermally insulated container of the present invention is preferably arranged to be removably mounted within a service cart, preferably an inflight service cart. Thus, in a second aspect, the invention relates to a service cart comprising a thermally insulated container as described herein.

Inflight service carts have been used for decades on commercial flights. They conventionally take the form of a rigid box, with casters at each corner of the base that can be locked to hold the cart in position. Both full and half size carts are available, which differ in their length: approximately 80 cm for a full size cart and 40 cm for a half size cart. Both full and half size carts are approximately 30 cm wide and around 1 m tall. Doors are typically provided at both the front and back of the cart in the case of full size carts, and just at the front for half size carts. The skilled person would be able to provide an insulated box which could be removably mounted within a conventional inflight service cart. Especially as there are only 3 major configurations of airline service carts available: ACE, ATLAS and KSSU, with each of these configurations being internationally recognised within the airline industry.

The present invention also relates to a method for storing and serving frozen confectionery items using the thermally insulated container of the first aspect of the invention.

The method comprises the step of cooling the reservoir of phase change material provided between the inner and outer surfaces of the product storage assembly and/or between the inner and outer surfaces of the at least one frozen confectionery item support to a temperature of less than −6° C. Preferably, the reservoir(s) of phase change material are stored for a period of at least 2 hours in a freezer operating below a temperature of −6° C. Preferably, the freezer operates at a temperature below −12° C., more preferably below −15° C. or even below −18° C. The lower limit of the freezer temperature is not especially important, and will largely depend on the operating parameters of the available freezer(s). Whilst there are commercially available freezers which operate at very low temperatures (e.g. below −70° C., such as at −80° C. or even −86° C.), these are mainly found in laboratories and it is more common for freezers to operate down to a temperature of −30° C. A cold store room operating at an appropriate temperature could be used in place of a freezer.

Next, the product storage assembly is mounted within the enclosed insulated chamber of the thermally insulated housing. The product storage assembly is positioned within the enclosed insulated chamber such that there is a gap between the outer surface of the product storage assembly and the inner surface of the thermally insulated housing, the gap having a width of 1 to 10 mm.

A plurality of frozen confectionery items are loaded within the product storage assembly, which may be before or after the freezing step discussed above. However it is preferred that the frozen confectionery items are added after the freezing step.

The frozen confectionery items are stored within the internal product storage chamber for a period of up to 24 hours. This time period relates to the storage of the frozen confectionery items remote from a freezer. The frozen confectionery items are served during this storage period by opening the openable portion of the thermally insulated housing and removing at least one of the frozen confectionery items from the internal product storage chamber, and then preferably closing the openable portion of the thermally insulated housing.

Preferably the frozen confectionery items are loaded into the product storage assembly by placing the frozen confectionery items into a drawer and engaging the drawer within the product storage assembly such that the drawer can be moved relative to the product storage assembly in a slideable manner between an open position and a closed position. The frozen confectionery items can then be served by opening the openable portion of the thermally insulated housing, sliding the drawer to the open position and removing at least one of the frozen confectionery items, and then preferably sliding the drawer to the closed position and closing the openable portion of the thermally insulated housing. It will be appreciated that a plurality of drawers can be used (as already discussed above).

The various features of the present invention referred to in individual sections above apply, as appropriate, to other sections mutatis mutandis. Consequently features specified in one section may be combined with features specified in other sections as appropriate.

As used herein the term "comprising" encompasses the terms "consisting essentially of" and "consisting of". Where the term "comprising" is used, the listed steps or options need not be exhaustive. As used herein, the indefinite article "a" or "an" and its corresponding definite article "the" means at least one, or one or more, unless specified otherwise. Unless otherwise specified, numerical ranges expressed in the format "from x to y" are understood to include x and y. In specifying any range of values or amounts, any particular upper value or amount can be associated with any particular lower value or amount. Except in the examples and comparative experiments, or where otherwise explicitly indicated, all numbers are to be understood as modified by the word "about".

The invention will now be illustrated, by way of example, and with reference to the following figures, in which.

Figure 1:
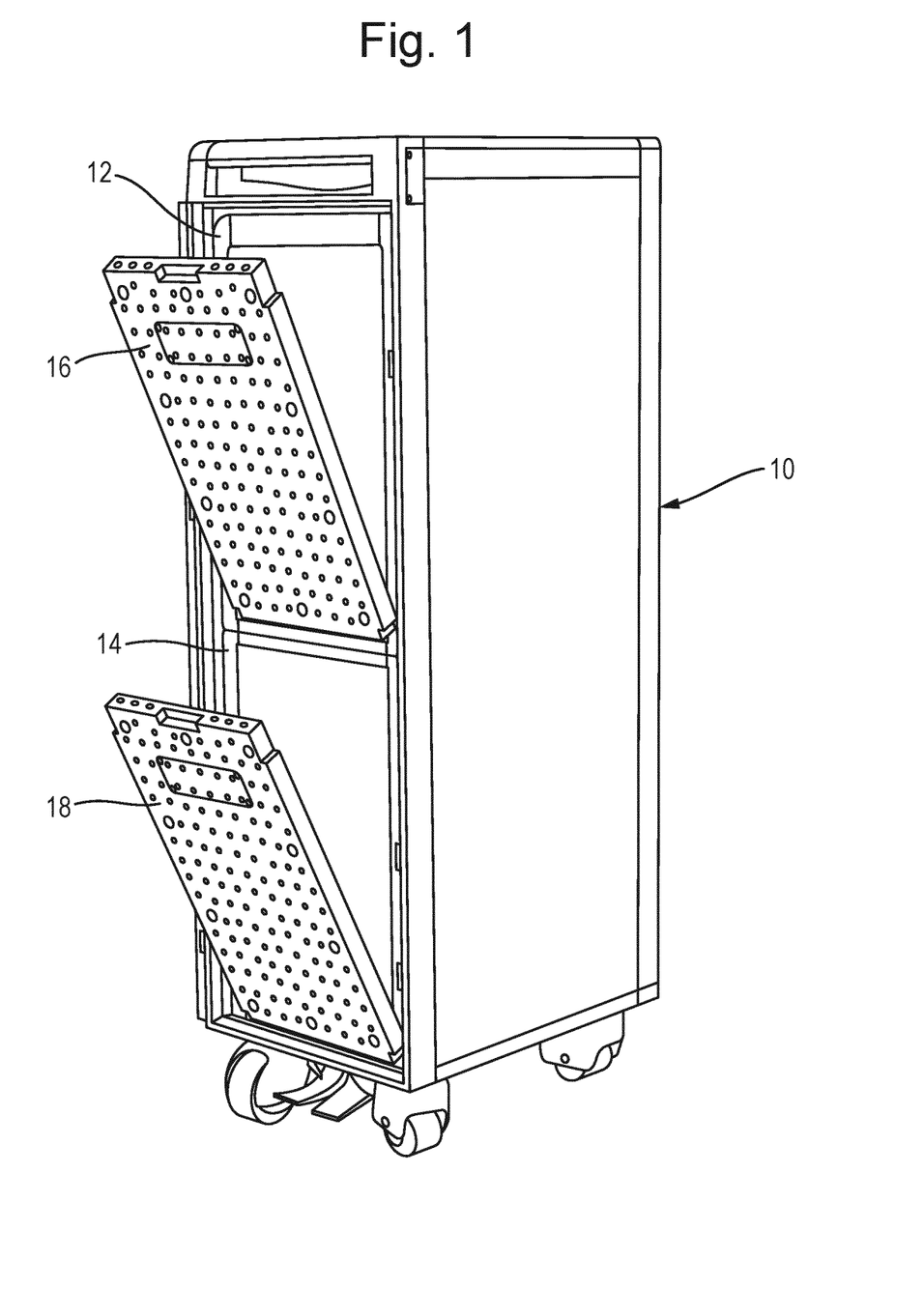
FIG. 1 is a perspective view of an in-flight service cart comprising two thermally insulated containers according to the present invention.

Turning to the figures, FIG. 1 shows an in-flight service cart 10 comprising a first thermally insulated container 12 and a second thermally insulated container 14. The first thermally insulated container 12 has an openable portion 16 permitting access to its internal product storage chamber. The second thermally insulated container 14 has an openable portion 18 permitting access to its internal product storage chamber.

Figure 2:
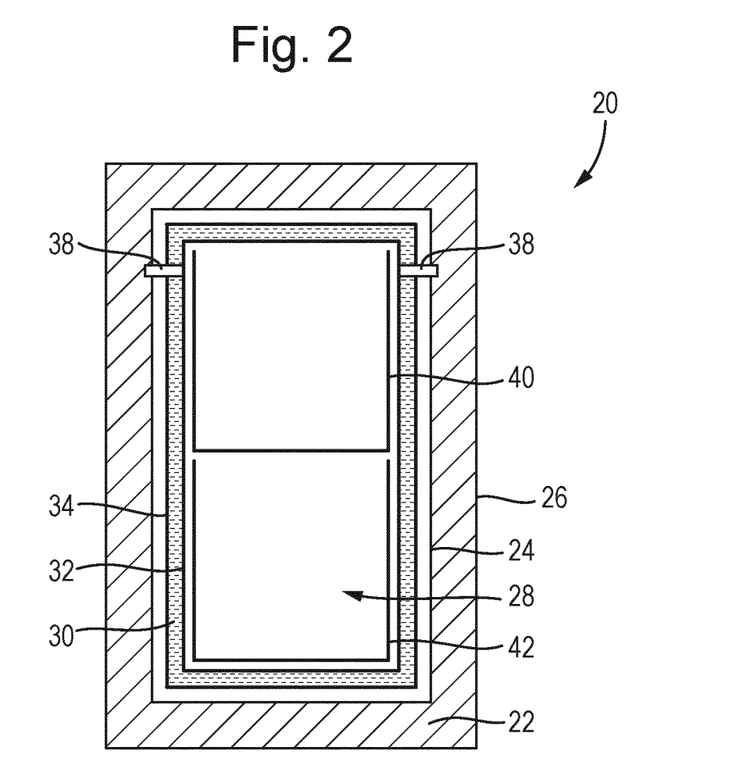
FIG. 2 is a front sectional view through a first thermally insulated container according to the present invention.

FIG. 2 is a front sectional view through a first thermally insulated container 20 comprising a thermally insulated housing 22 having an inner surface 24 and an outer surface 26. The outer surface 26 is designed to engage with a service cart and will contain the necessary mechanical interlocking arrangement, such as ridges, latches and interconnections to enable such engagement according to the particular design of the service cart, however these are not shown in the figure. The inner surface 24 encompasses an enclosed insulated chamber 28.

Mounted within the enclosed insulated chamber 28 is a product storage assembly 30 having an inner surface 32 and an outer surface 34. The product storage assembly 30 is mounted in the enclosed insulated chamber by pins 38, which provide a stable yet minimal degree of physical contact between the product storage chamber 30 and the thermally insulated housing 22. The product storage assembly 30 is comprised of four sides, a top, bottom and two sides, leaving the front and back open to expose the internal product storage chamber. The gap between the outer surface 34 of the product storage assembly 30 and the inner surface 24 of the thermally insulated housing 22 is approximately 6 mm, but can be from 1 to 10 mm as desired.

Positioned within the product storage assembly 30 are a first drawer 40 and second drawer 42 providing a pair of frozen confectionery item supports. The drawers 40, 42 are made from plastic material, although they could be made from a conductive material such as metal.

Although not shown, the thermally insulated housing 22 is openable to expose the drawers 40, 42 so that they can be withdrawn from the product storage assembly 30.

Each of the four walls of the product storage chamber 30 are made from a pair of roll-bonded aluminium metal sheets. One or both sheets comprise a series of depressions, so that a series of cavities are produced between the inner 32 and outer 34 surfaces. Phase change material is contained within the cavities.

Figure 3:
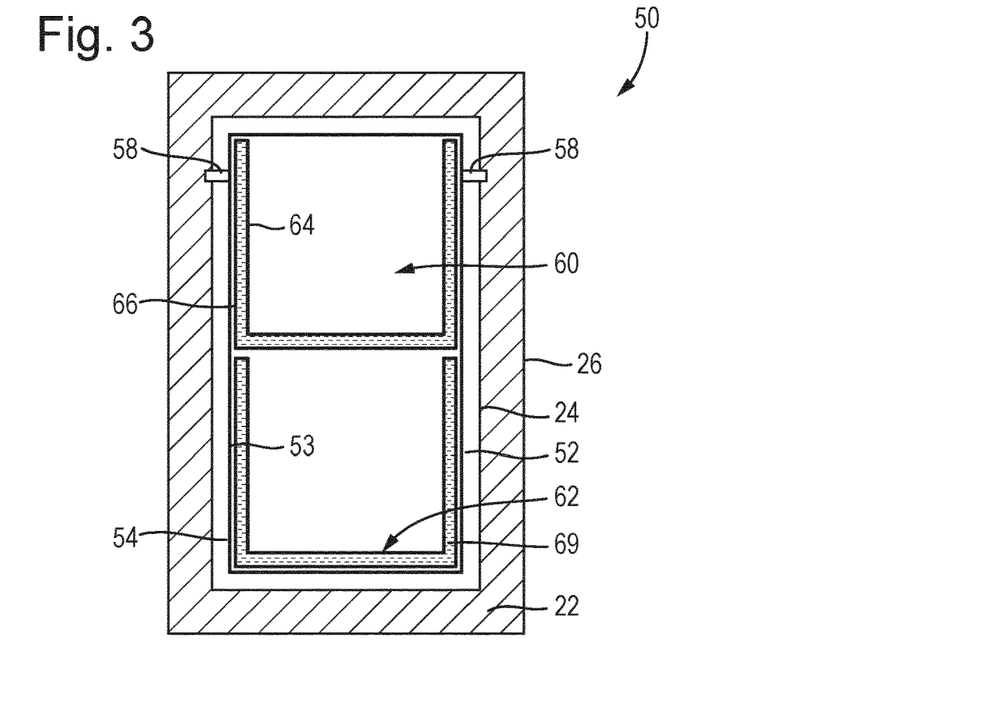
FIG. 3 is a front sectional view through a second thermally insulated container according to the present invention.

FIG. 3 shows a front sectional view through a second thermally insulated container 50. The thermally insulated housing 22 is essentially the same as that shown in FIG. 2. Mounted within the enclosed insulated chamber 28 is a product storage assembly 52 having an inner surface 53 and an outer surface 54. The product storage assembly 52 is mounted in the enclosed insulated chamber by pins 58, which provide a stable yet minimal degree of physical contact between the product storage assembly 52 and the thermally insulated housing 22. Other mounting arrangements are possible. The product storage assembly 52 is comprised of four sides, a top, bottom and two sides, leaving the front and back open to expose the internal product storage chamber. The gap between the outer surface 54 of the product storage assembly 52 and the inner surface 24 of the thermally insulated housing 22 is approximately 6 mm, but can be from 1 to 10 mm as desired. The product storage assembly 52 is made from plastic material, although they could be made from a conductive material such as metal.

Positioned within the product storage assembly 52 are a first drawer 60 and second drawer 62 providing a pair of frozen confectionery item supports. The drawers 60, 62 each have an inner surface 64 and an outer surface 66.

Although not shown, the thermally insulated housing 22 is openable to expose the drawers 60, 62 so that they can be withdrawn from the product storage assembly 52.

Each of the walls of the drawers 60, 62 are made from a pair of roll-bonded aluminium metal sheets. Each sheet comprises a series of complementary depressions, so that a series of cavities are produced between the inner 64 and outer 66 surfaces. Phase change material 69 is contained within the cavities.

Figure 4:
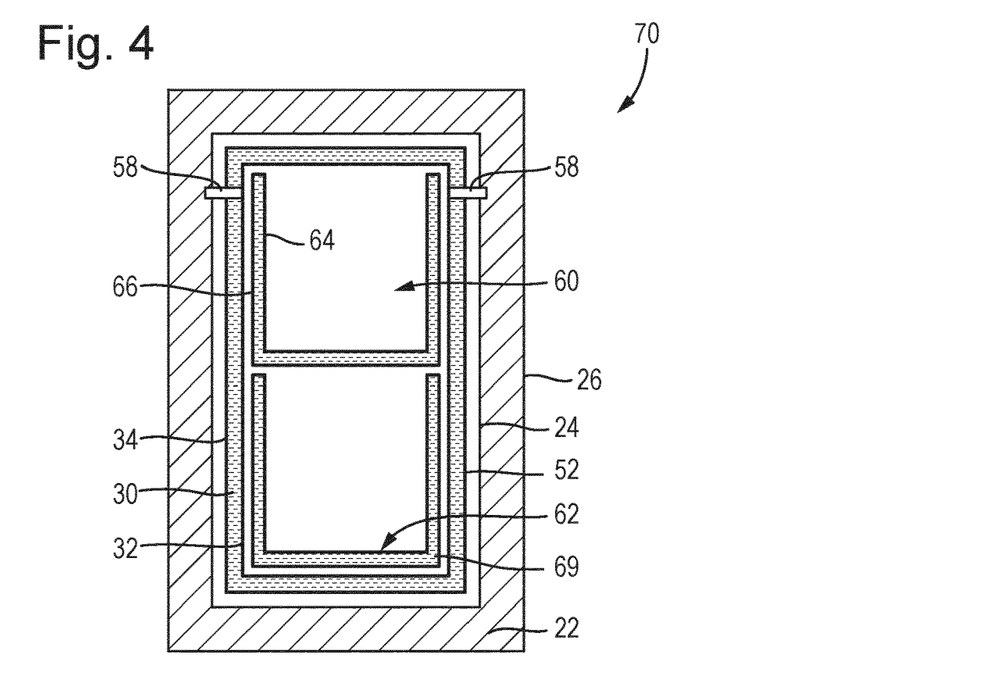
FIG. 4 is a front sectional view through a third thermally insulated container according to the present invention.

FIG. 4 shows a front sectional view through a third thermally insulated container 70. The thermally insulated container comprises a product storage assembly 52 as shown in FIG. 3, combined with a first drawer 60 and second drawer 62 providing a pair of frozen confectionery item supports as shown in FIG. 2.

Figure 5A:
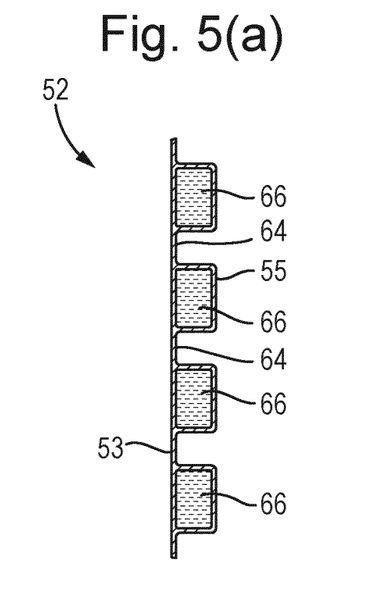
FIG. 5 is a sectional schematic representation through a wall of a product storage assembly for use in the present invention.
Figure 5B:
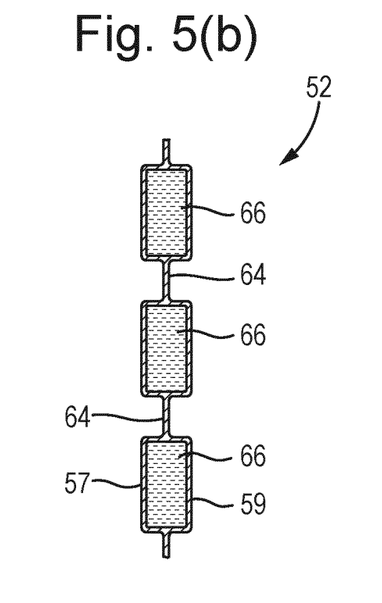

FIG. 5 shows a sectional schematic representation through two types of wall of a product storage assembly 52. FIG. 5(a) shows a flat inner wall 53 (providing part of the inner surface) bonded to an outer wall 55 (providing part of the outer surface) comprising a number of depressions 64. Equally the inner wall could be the outer wall and the outer wall could be the inner wall. The phase change material is provided within the contained cavities 66 provided by the depressions 64. FIG. 5(b) shows an inner wall 57 (providing part of the inner surface) comprising a number of depressions 64 bonded to an outer wall 59 (providing part of the outer surface) also comprising a number of depressions 64. The depressions 64 are aligned with a corresponding depression to provide cavities 66 within the wall of the product storage assembly to contain the phase change material.

Figure 6:
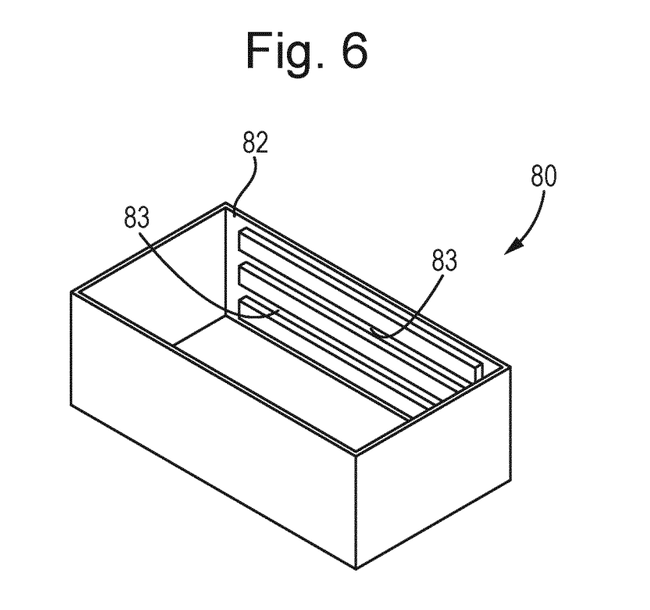
FIG. 6 is a perspective schematic representation of a frozen confectionery item support for use in the present invention.

FIG. 6 shows a perspective schematic representation of a drawer 80 providing a frozen confectionery item support. One wall 82 is provided by a sheet of metal comprising depressions 83 and providing part of the inner surface of the frozen confectionery item support. This is bonded to a flat outer wall (not shown) such that the depressions 83 provide cavities within which the phase change material is located.

The invention claimed is:

1. A thermally insulated container for storing and serving frozen confectionery items, and suitable for mounting within a service cart, the thermally insulated container being unpowered and comprising:

a thermally insulated housing having an inner surface, defining an enclosed insulated chamber, and an outer surface for mounting engagement with the service cart, the thermally insulated housing having at least one openable portion to allow access to the enclosed insulated chamber through both the inner and outer surfaces;

a product storage assembly, mounted within the enclosed insulated chamber, having an outer surface and an inner surface and comprising a bottom, the inner surface defining an internal product storage chamber, the internal product storage chamber being accessible via the openable portion of the thermally insulated housing, and the outer surface being substantially parallel to but spaced away from at least 90% of the surface area of the inner surface of the thermally insulated housing, the average spacing being from 1 to 10 mm;

at least one frozen confectionery item support comprising a shelf positioned in the internal product storage chamber, the frozen confectionery item support having an outer surface facing away from a supported item in use and an inner surface facing towards the supported item in use, and wherein a reservoir of phase change material is provided between the inner and outer surfaces of the product storage assembly and/or between the inner and outer surfaces of the at least one frozen confectionery item support.

2. The thermally insulated container according to claim 1, wherein the inner surface of the internal product storage chamber comprises an inner thermally conductive sheet, and the outer surface of the internal product storage chamber comprises an outer thermally conductive sheet, the inner and outer thermally conductive sheets enclosing between them an enclosed space comprising a reservoir of phase change material.

3. The thermally insulated container according to claim 1, wherein the inner surface of the at least one frozen confectionery item support comprise an inner thermally conductive sheet, and the outer surface of the at least one frozen confectionery item support comprises an outer thermally conductive sheet, the inner and outer thermally conductive sheets enclosing between them an enclosed space comprising a reservoir of phase change material.

4. The thermally insulated container according to claim 2, wherein the inner and outer thermally conductive sheets are bonded metal sheets.

5. The thermally insulated container according to claim 1, wherein the spacing between the outer surface of the product storage assembly and the inner surface of the thermally insulated housing is from 2 to 8 mm.

6. The thermally insulated container according to claim 1, wherein the at least one frozen confectionery item support is at least one drawer that is withdrawable from the product storage assembly via the openable portion of the thermally insulated housing.

7. The thermally insulated container according to claim 1, wherein the outer surface of the product storage assembly is spaced away from at least 95% of the surface area of the inner surface of the thermally insulated housing.

8. The thermally insulated container according to claim 1, wherein the phase change material has a melting point of from −30° C. to −6° C.

9. The thermally insulated container according to claim 1, wherein the ratio of the amount of phase change material (kg) to the volume of enclosed insulated chamber (litre) is in the range of from 1:25 to 1:5.

10. A service cart comprising a thermally insulated container according to claim 1.

11. The service cart according to claim 10, wherein the service cart is an in-flight service cart.

12. A method for storing and serving frozen confectionery items using a thermally insulated container as claimed in claim 1, the method comprising:
  cooling the reservoir of phase change material provided between the inner and outer surfaces of the product storage assembly and/or between the inner and outer surfaces of the at least one frozen confectionery item support to a temperature of less than $-6°$ C.;
  mounting the product storage assembly within the enclosed insulated chamber of the thermally insulated housing, wherein a plurality of frozen confectionery items are loaded within the product storage assembly; and wherein the product storage assembly is mounted within the enclosed insulated chamber such that the outer surface of the product storage assembly is substantially parallel to but spaced away from substantially all of the inner surface of the thermally insulated housing, the average spacing being from 1 to 10 mm;
  storing the frozen confectionery items within the enclosed insulated chamber for a period of up to 24 hours and serving the frozen confectionery items during the storage period by opening an openable portion of the thermally insulated housing and removing at least one of the frozen confectionery items from the enclosed insulated chamber, and then preferably closing the openable portion of the thermally insulated housing.

13. The method for storing and serving frozen confectionery items as claimed in claim 12, wherein:
  the frozen confectionery items are loaded into the product storage assembly by placing the frozen confectionery items into a frozen confectionery item support; and
  the frozen confectionery items are served by opening the openable portion of the thermally insulated housing, removing at least one of the frozen confectionery items, and closing the openable portion of the thermally insulated housing.

14. The method for storing and serving frozen confectionery items as claimed in claim 13, wherein: the frozen confectionery item support is a drawer and the method involves engaging the product drawer within the product storage assembly such that the drawer can be moved relative to the product storage assembly in a slideable manner between an open position and a closed position; and sliding the product drawer to the open position and then, following removal of the at least one of the frozen confectionery items, preferably sliding the product drawer to the closed position.

15. The thermally insulated container according to claim 5, wherein the spacing between the outer surface of the product storage assembly and the inner surface of the thermally insulated housing is from 3 to 5 mm.

16. The thermally insulated container according to claim 1 wherein the shelf comprises a drawer.

* * * * *